(12) United States Patent
Troy et al.

(10) Patent No.: US 8,744,133 B1
(45) Date of Patent: Jun. 3, 2014

(54) METHODS AND SYSTEMS FOR LOCATING VISIBLE DIFFERENCES ON AN OBJECT

(75) Inventors: James J. Troy, Issaquah, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 723 days.

(21) Appl. No.: 12/897,408

(22) Filed: Oct. 4, 2010

(51) Int. Cl.
*G06K 9/00* (2006.01)

(52) U.S. Cl.
USPC ......................................................... 382/106

(58) Field of Classification Search
None
See application file for complete search history.

(56) References Cited

U.S. PATENT DOCUMENTS

| | | | |
|---|---|---|---|
| 6,618,133 B2 * | 9/2003 | Hedges et al. | 356/141.4 |
| 6,630,993 B1 * | 10/2003 | Hedges et al. | 356/141.4 |
| 6,674,877 B1 * | 1/2004 | Jojic et al. | 382/103 |
| 7,194,326 B2 * | 3/2007 | Cobb et al. | 700/114 |
| 7,305,277 B2 * | 12/2007 | Freeman et al. | 700/114 |
| 2008/0181454 A1 * | 7/2008 | Wirtz et al. | 382/103 |
| 2009/0086014 A1 | 4/2009 | Lea et al. | |
| 2009/0086199 A1 * | 4/2009 | Troy et al. | 356/251 |
| 2010/0228506 A1 | 9/2010 | Motzer et al. | |
| 2011/0268322 A1 * | 11/2011 | Clausen et al. | 382/106 |

OTHER PUBLICATIONS

U.S. Appl. No. 12/631,810, filed Dec. 5, 2009.

* cited by examiner

*Primary Examiner* — Nancy Bitar
(74) *Attorney, Agent, or Firm* — Armstrong Teasdale LLP

(57) ABSTRACT

A method for detecting and determining a location of visible areas of change on a target object is described. The method includes locating, in position and orientation, a local positioning system with respect to the target object, determining an offset between the position and orientation of the local positioning system and a prior position and orientation of a local positioning system previously utilized to collect a set of reference images of the target object, the prior position and orientation in the coordinate system of the target object, repositioning, in position and orientation, the local positioning system with respect to the target object by the determined offset, acquiring a set of images of the target object from the position and orientation of the repositioned local positioning system, comparing the set of images to corresponding images within the set of reference images to detect a difference between the acquired images and the corresponding reference images, and determining a location of the detected difference in the coordinate system of the target object.

18 Claims, 6 Drawing Sheets

METHODS AND SYSTEMS FOR LOCATING VISIBLE DIFFERENCES ON AN OBJECT

BACKGROUND

The field of the disclosure relates to methods and systems for locating visible differences on an object and accurately measuring the locations of potential damage on the object, for example, a large commercial airplane.

Finding and accurately measuring the locations of potential damage on an object, like a large commercial airplane, can be a laborious task. An efficient and automated process for addressing this problem would be valuable to many organizations involved in building and maintaining large vehicles and structures.

From two dimensional images alone it is difficult to get accurate measurements of aircraft locations defined in aircraft coordinates. Often, an item of known dimensions (like a tape measure) is inserted in the picture to give the analyst a size reference. But even with a reference scale, it can be difficult to measure a precise location in the desired coordinate system. Determining the correct location is especially difficult in areas where few uniquely identifiable landmark features exist. In addition, human analysis of a large number of potential damage areas would likely be error prone. Therefore, it is desirable to have as much of the damage detection and location process as automated as possible.

A number of manual or semi-automated options exist to determine local coordinate measurements of damage. One common approach is visual inspection and/or human analysis of images, along with the use of a tape measure to determine damage locations. Using a tape measure can be inaccurate, difficult and somewhat dangerous on an object as large as a commercial airplane, which can involve use of ladders, ropes, scissor or snorkel lifts to reach the damage areas.

The disadvantages of using a tape measure (and similar type of methods) are that the process can be inaccurate, time consuming and includes the possibility of human error. In some situations safety is also a concern, and for measurement of certain objects, contact with measurement tools is undesirable.

A local positioning system (LPS) can be used to provide measurements without climbing on or around the target object (such as an airplane). However, except for the embodiments described herein, the LPS is a manually controlled instrument, which makes the task of finding and measuring a large number of potentially damaged areas very time consuming.

BRIEF DESCRIPTION

In one aspect, a method for detecting and determining a location of visible areas of change on a target object is provided. The method includes locating, in position and orientation, a local positioning system with respect to the target object, determining an offset between the position and orientation of the local positioning system and a prior position and orientation of a local positioning system previously utilized to collect a set of reference images of the target object, the prior position and orientation in the coordinate system of the target object, repositioning, in position and orientation, the local positioning system with respect to the target object by the determined offset, acquiring a set of images of the target object from the position and orientation of the repositioned local positioning system, comparing the set of images to corresponding images within the set of reference images to detect a difference between the acquired images and the corresponding reference images, and determining a location of the detected difference in the coordinate system of the target object.

In another aspect, a system for detecting and determining a location of visible areas of change on a target object in coordinates associated with the target object is provided. The system includes a local positioning system having an image acquisition device, a range measurement device, and a target vector alignment device, and a processing device communicatively coupled to the image acquisition device, the range measurement device, and the target vector alignment device. The processing device is programmed to determine a position and orientation of said local positioning system relative to the target object, compute an offset transform from the position and orientation of said local positioning system to a reference position and orientation, the reference position and orientation being a position and orientation of a local positioning system utilized to acquire a set of reference images associated with the target object, utilize the offset transform to generate instructions related to a repositioning and reorienting of the local positioning system to substantially the same position and orientation as the reference position, operate said image acquisition device to acquire a set of images of the target object, compare the set of images to corresponding images within the set of reference images to detect a difference between the acquired images and the corresponding reference images, and determine a location of the detected difference in coordinates associated with the target object.

In still another aspect, a method for providing a location for a visibly detectable change on a surface of a target object, the location provided in coordinates associated with the target object is provided. The method includes determining a two dimensional pixel location of a detectable change in an acquired image of at least a portion of the target object as compared to a reference image of at least a portion of the target object, utilizing the two dimensional pixel location to direct a local positioning system to the detectable change, taking measurements at the detectable change with the local positioning system, and computing, from the local positioning system measurements, the three dimensional positions of the detectable change in coordinates associated with the target object.

The features, functions, and advantages that have been discussed can be achieved independently in various embodiments or may be combined in yet other embodiments further details of which can be seen with reference to the following description and drawings.

DETAILED DESCRIPTION

Figure 1:
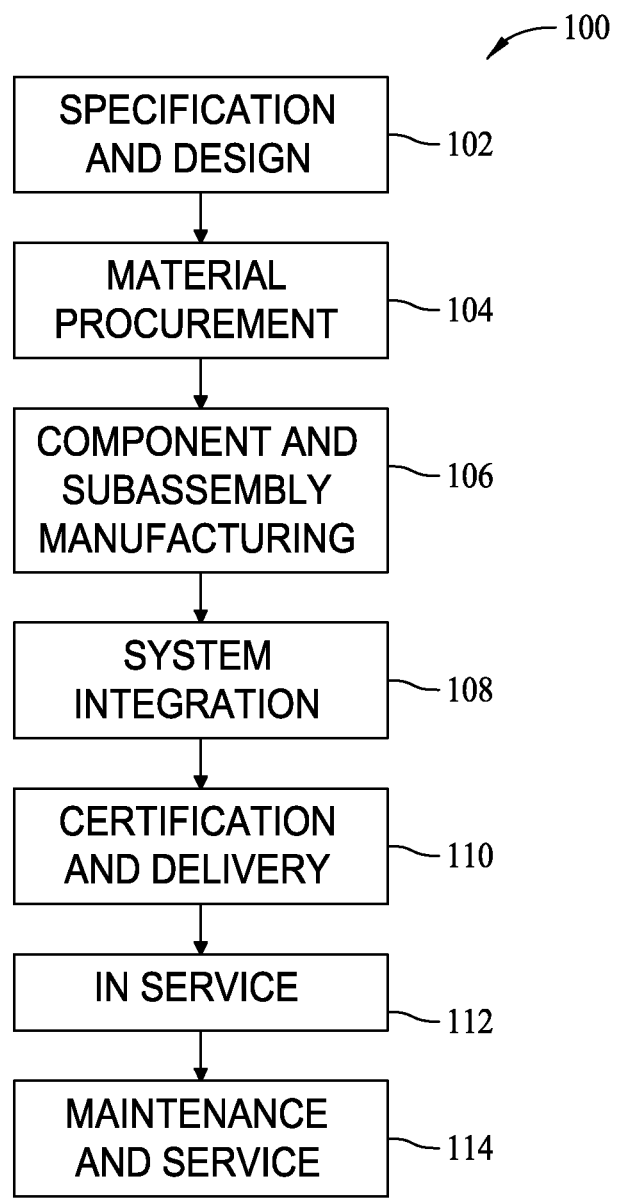
FIG. 1 is a flow diagram of an aircraft production and service methodology.

The described embodiments are related to methods and systems for automatically detecting visible areas of change (such as damage) on the surface of a target object (such as an aircraft), and then automatically measuring the locations of these areas in the local coordinate system of the target object.

As further described herein, the system uses a sequence of image pairs collected by a digital camera associated with a local positioning system (LPS), along with image change detection software, to determine the two dimensional pixel locations in the image of areas of interest. The two dimensional data is then utilized to direct the LPS unit to take measurements and compute the three dimensional positions of those areas of interest expressed in the coordinate system of the target object. To accomplish the above, the LPS is modified to automate the image collection, analysis, and conversion into three dimensional target coordinates. Such processes are described herein where, with modifications and enhancements, the operation of LPS is automated to process the two dimensional images and obtain the necessary three dimensional measurement results.

The following sentences include definitions and explanation of terminology used herein. For example, a coordinate system is the frame of reference defined by three orthogonal directions (X, Y, Z). Coordinate systems can be attached to both moving and stationary objects. Cartesian coordinates refer to a rectangular (orthogonal) coordinate system. Local coordinates refer to a coordinate system defined for a specific object.

Translation refers to linear motions between two coordinate systems, while rotation refers to angular motions between two coordinate systems. A position refers specifically to the X, Y, Z measurements of a point defined in a specific coordinate system. Orientation refers specifically to the rotational measurements of one coordinate system relative to another.

A rotation matrix describes a 3×3 orthogonal matrix that describes the orientation of one coordinate system to another and a transformation matrix describes a 4×4 homogeneous matrix that describes the relative position and orientation of one coordinate system to another. The transformation matrix is sometimes referred to as a transformation or as a matrix.

Absolute motion refers to the movement relative to a world coordinate system and relative motion refers to movement of one coordinate system relative to another (local motion).

Change detection is a process used to determine the difference between two or more images. Computer vision refers to applications that obtain information from images for use in mapping, analysis, or control. Digital image processing describes a computer-based analysis of an image or series of images. A pixel refers to picture elements that make up a two dimensional digital image. Segmentation is the process of labeling of pixels with similar properties in a digital image.

The embodiments are sometimes described in terms of finding and measuring the locations of areas on an aircraft surface in which potential damage may have occurred. The damage is determined from a series of before and after image pairs, in which image processing software is utilized to determine if something had changed from the time the first image was acquired to the time the second image is acquired. Once potential image differences are found, it is necessary to determine the corresponding three dimensional locations (X, Y, Z) on the aircraft, preferably in the local coordinate system associated with the aircraft instead of a coordinate system defined in the hangar or measurement device reference frame. The local aircraft coordinate measurements are recorded or otherwise used to direct further detailed inspection, repairs, and/or generation of reports related to aircraft damage.

Figure 2:
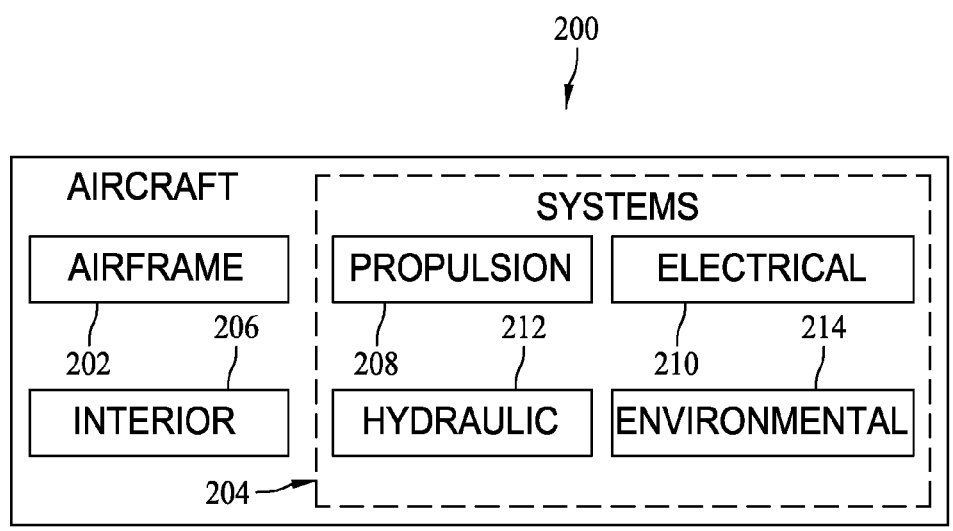
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 that may be performed during system integration 108 and/or routine maintenance and service 114.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
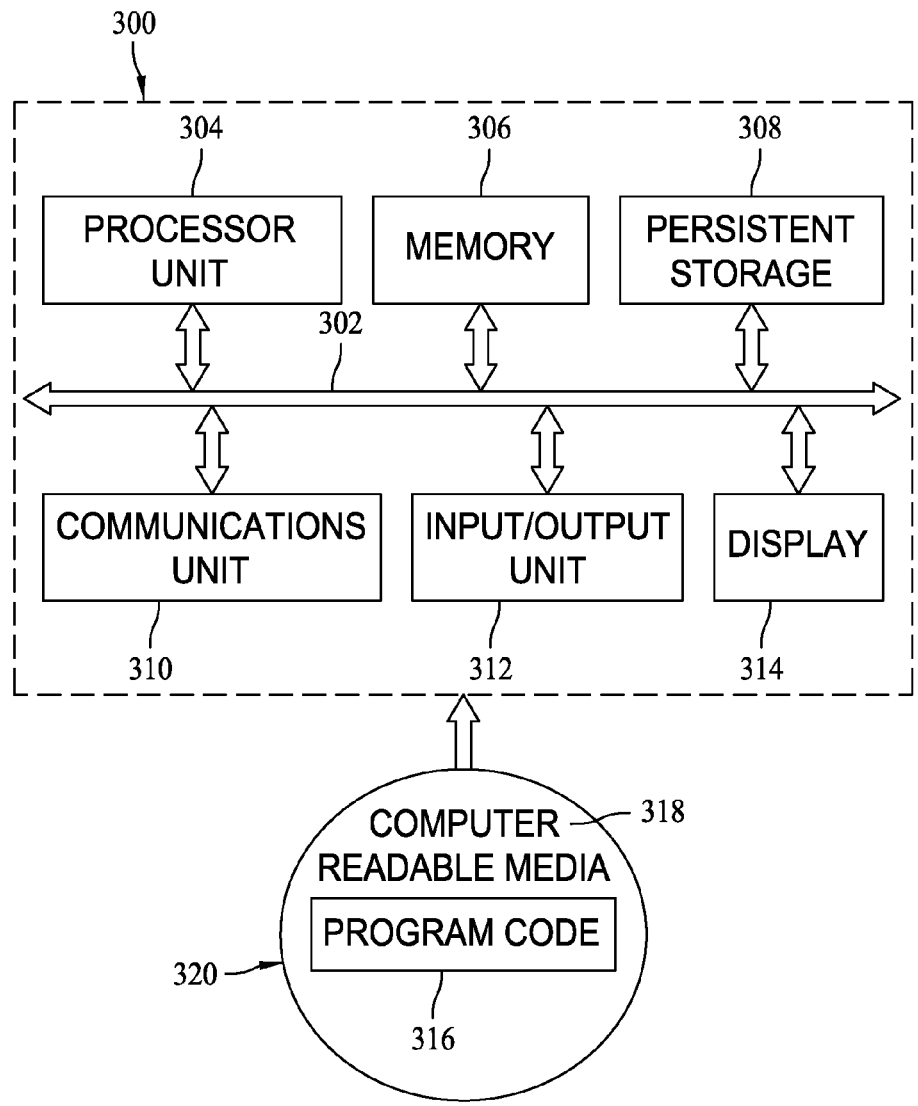
FIG. 3 is a diagram of a data processing system.

Turning now to FIG. 3, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard, mouse, or other human interface device (such as a joystick). In addition, input/output may also come from networked devices using connections such as network sockets. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code or data.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As described above, one described embodiment relates to a process for automatically detecting visible areas of change (such as damage) on the surface of a target object (such as an airplane), and then automatically measuring the locations of these areas in the local coordinate system of the target object. The system described below uses a sequence of image pairs collected by the digital camera of the Local Positioning System (LPS), along with image change detection software, to determine the two dimensional pixel locations in the image of areas of interest, and then uses that data to direct the LPS unit to take measurements and compute the three dimensional positions of those areas expressed in the coordinate system of the target object.

Figure 4:
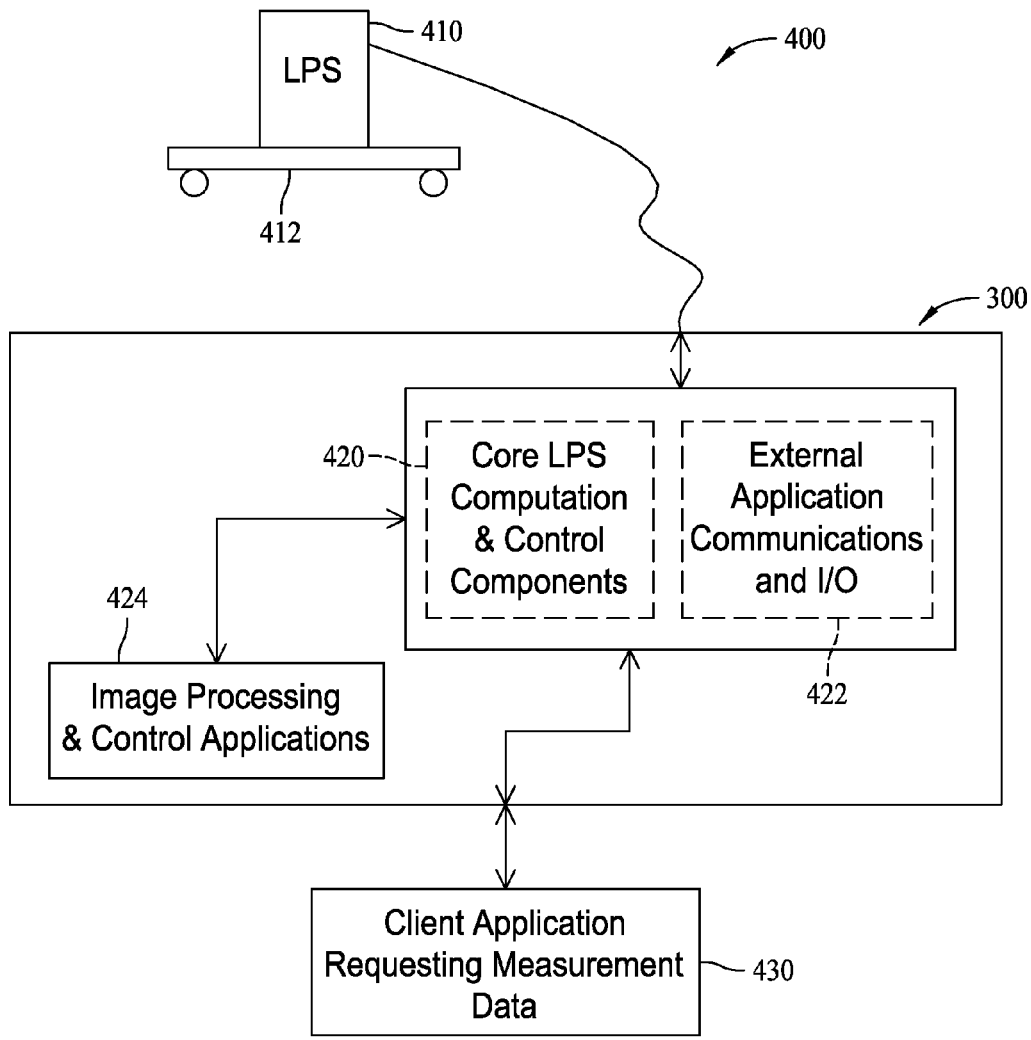
FIG. 4 is a diagram of a system which operates to take two dimensional image positions of a target object and produce three dimensional position data defined in the local coordinate system of the target object.

FIG. 4 is a diagram of a system 400, which incorporates the data processing system 300 of FIG. 3, and operates to take two dimensional image positions, expressed as pixel locations, and produce three dimensional position data defined in the local coordinate system of the target object. The process associated with system 400 can be controlled by a human operator or can be automated. System 400 includes a local positing system (LPS) 410 which may be located on a mobile platform 412. LPS 410 communicates with system 300 described above with respect to FIG. 3. System 300 includes several applications using data received from LPS 410 and providing data to LPS 410. Core LPS computation and control components 420 uses the data received from LPS 410 to determine if LPS 410 should moved to a new position. External application communications and I/O 422 provides an interface to both LPS 410 and a client application 430 receiving the LPS measurement data. Image processing and control applications 424 uses the image data received from LPS 410 to compare against previously saved images of an object to determine if a change has occurred on the object.

In one embodiment, core LPS computation and control components 420, external application communications and I/O 422, and image processing and control applications 424 communicate with each other through network socket interface connections, and are run on one or multiple processing devices. Additional applications with socket communications interfaces can be plugged-in to the main system 400 through the external application communications and I/O 422, allowing sharing of hardware resources and direct communications with other applications that require measurement data. In other embodiments, system 400 may operate in a stand-alone configuration without a client application, and writes measurement data to a file or display.

When triggered by a human operator, timer, or automated application system 400 will captures a sequence of images and compares them to a reference image set. Differences between pairs of images are detected and the image pixel locations are used to define the direction to point the measurement instrument (i.e. the LPS unit 410). When the desired location is reached the LPS unit 410 performs a distance measurement and computes the Cartesian (X, Y, Z) position on the surface in the coordinate system of the target object. This position data is then displayed, stored, or sent to client application 430 that requested the data.

For certain embodiments of the described process, the target object and instrument are in fixed positions relative to each other, but in some use cases the relative position may have changed. In these situations, if the positions and orientations of the camera in the before and after images are not too far apart, image processing techniques are used to estimate the offset. Techniques for image-based localization, such those used in SLAM (Simultaneous Localization and Mapping), may be used. In SLAM, relative displacements of features common to both images are used to provide the offset estimate. For this, relatively small position and orientation changes are required, along with substantial overlap between the images in order to achieve registration. Additionally, known reference dimensions are required to determine the scale of the displacement.

Requiring small position and orientation changes, along with a large amount of image overlap, is not always possible. A more general process is needed to ensure that the relative realignment between the target and instrument can be achieved for a wider range of conditions. One solution is to provide a way to move the instrument back into the same relative position and orientation as it was when the reference image was taken. As described above, one option is to put the instrument (LPS 410) on a movable support, such as a mobile platform 412, robot arm, or crane. After the LPS unit is calibrated in its current position relative to the target object (either of which may be different from the initial reference position) the offset transformation matrix can be computed.

Figure 5:
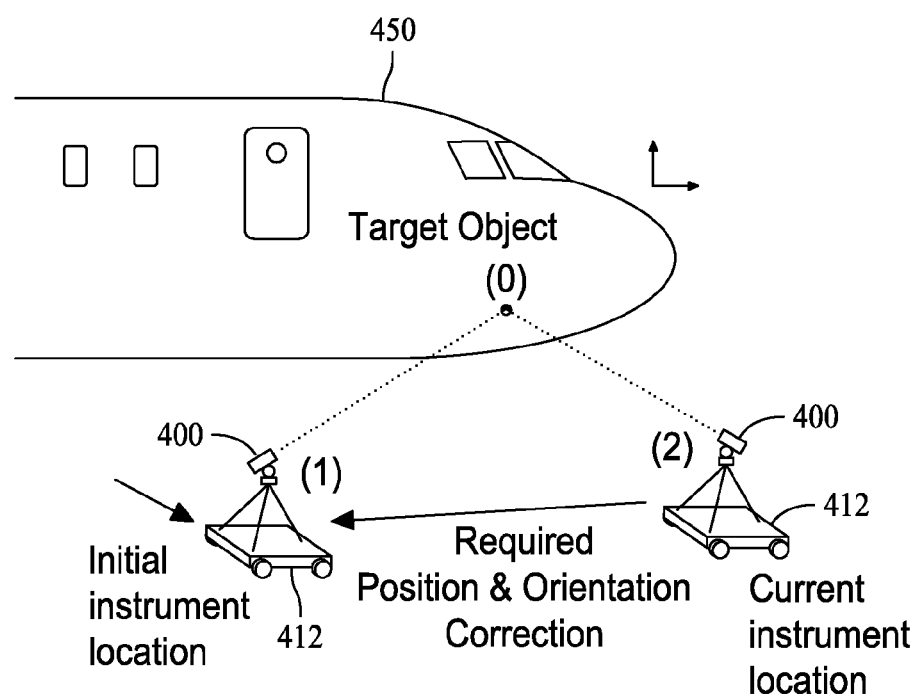
FIG. 5 is an illustration of the automated measurement system of FIG. 4 depicting instrument realignment with respect to the target object.

The mobile platform then translates and rotates the instrument by this amount to achieve realignment with the original position and orientation. Any residual small differences can be compensated by image shifting/rotation based on image processing techniques similar to those used in image-based localization. FIG. 5 shows an example of the automated measurement system 400 with optional mobile platform 412 depicting instrument realignment of LPS 410 with respect to the target object 450 as described above.

Figure 6:
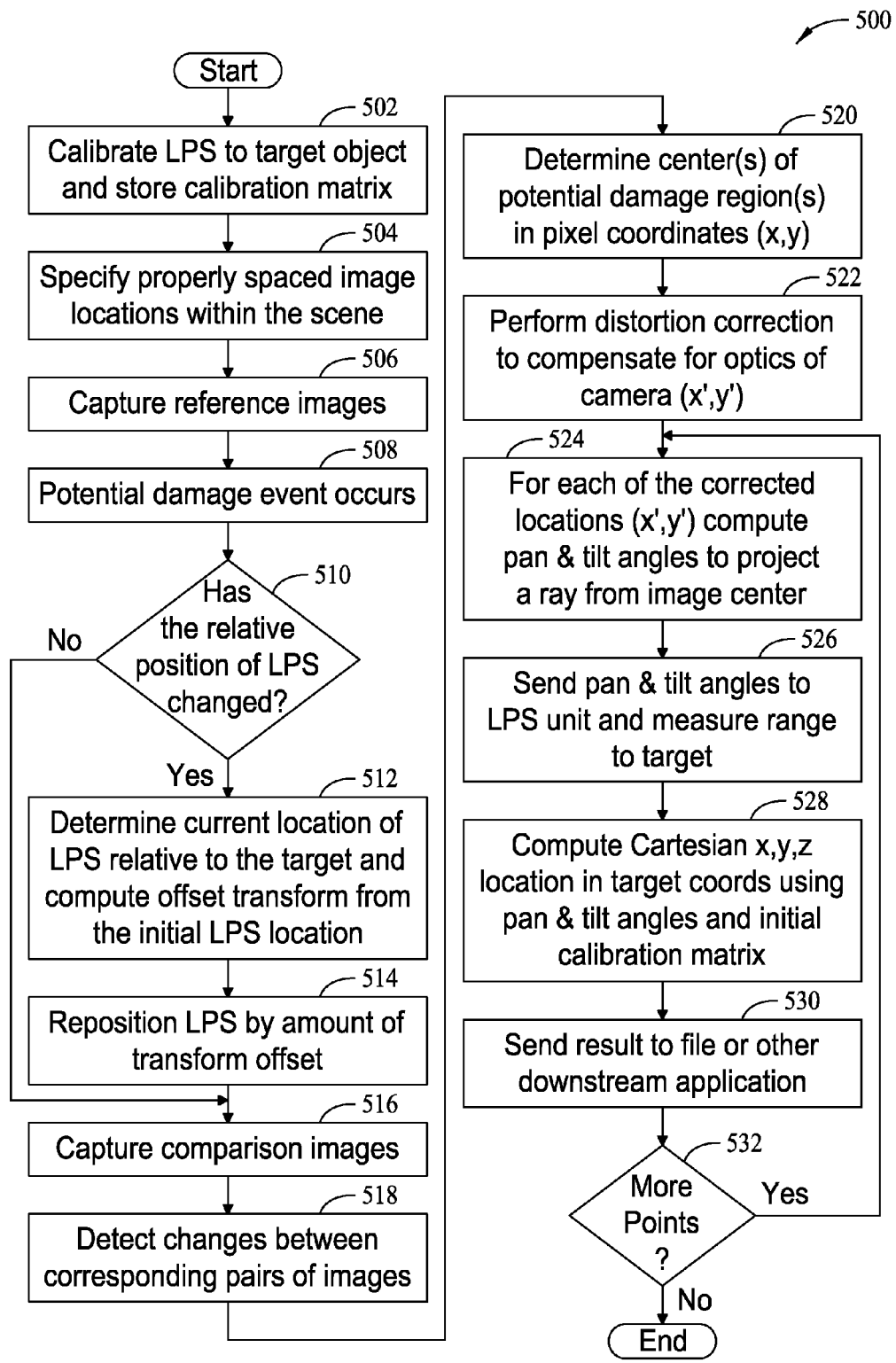
FIG. 6 is a flowchart that illustrates a process for location of visible differences on a target object.

FIG. 6 is a flowchart 500 that illustrates the process for locating positions in three dimensions of visible differences on an object. More specifically, flowchart 500 provides details associated with the automated imaging capture, image processing, instrument realignment, and integration with the LPS three-dimensional measurement process.

LPS 410 is calibrated 502 to a target object and a calibration matrix is stored. Properly spaced image locations are specified 504 within the scene associated with the target object. An initial set of images is captured 506. Specifically, a sequence of reference images are captured along with X, Y, Z location data associated with the image center for each of the images captured 506.

The target object, for example, an aircraft, is placed into service and over time a potential damage event occurs 508 and the target object is once again placed in a position with respect to LPS system 400. In a typical scenario, the position of the object with respect to the LPS 400 may be somewhat different than the relative position between the two when the initial images were captured 506, resulting in an affirmative response when considering whether the relative position of the LPS has changed 510.

The current location of the LPS 410 relative to the target is determined 512 and an offset transform from the initial LPS location is computed. The LPS 410 is repositioned 514 by the offset transform amount. After LPS repositioning, a sequence of current images are captured 516 from the same relative location. Pairs of images taken from the same position and orientation are compared to detect 518 changes. For example, regions of change can be determined using digital image processing techniques. One such process may involve image subtraction, blur filters, and image segmentation steps.

The locations of differences are determined 520. The centroid of each area is found and converted into pixel coordinates (x, y). A distortion correction is performed 522 to compensate for the optics of the camera associated with the LPS 410 where two-dimensional image corrections are applied resulting in (x', y'). This correction may depend on, for example, the lens optics, zoom, and focus levels. The corrections are determined 522 experimentally in one embodiment, and recalled at run-time using a table lookup.

A target vector is determined 524 where the corrected pixel values (x', y'), along with the initial image location data, are used to determine new azimuth and elevation (pan and tilt) angles defining the vector from the instrument to the target. In one embodiment, LPS 410 includes a pan and tilt unit (PTU) (not shown) which is driven 526 to the determined 524 pan and tilt angles and a new range measurement is taken. The pan and tilt unit is similar to pan and tilt units used on such things as security cameras and telescopes and provides highly accurate data with respect to a positioning of one or both of the range measurement device and the imaging device.

A location is computed 528, for example, in Cartesian coordinates associated with the target object. These target coordinates are determined from the pan, tilt, and range data, along with the object-to-instrument calibration matrix. Resulting measurement data can be saved, displayed, or sent 530 to other client applications though socket connections. If more points are to be transferred, the process resumes 532 with pan and tilt calculations associated with the next location, otherwise the process ends.

In one initial implementation, each set of before and after images (reference images and current images) are made up of a mosaic of slightly overlapping images that cover the target areas on the object to be inspected. A medium resolution camera with a large optical zoom range is used to provide coverage of the scene. For the initial scene partitioning task, the specific camera orientation angles and zoom levels can be computed automatically and then used to drive the instrument's pan and tilt motors to specific locations. The distance to the target at each of these images is measured (for the LPS process used here, distance measurements are performed using a laser range meter) and stored for later use.

At a minimum, one image and one three-dimensional measurement (using pan, tilt, and distance data) are needed for each position in the mosaic, but due to transient events it may sometimes be useful to take multiple images from the same location which allows for momentary lighting changes or other temporary occlusions (like an insect flying in front of the camera or rain/snow) to be filtered out.

Once the set of images have been collected that match the location of the reference images, the image processing phase occurs. If the image pairs have uniform lighting, brightness/contrast corrections can be used to match overall image levels. For a situation where shadows are cast over part of an image, dedicated light sources may be used with the LPS unit, for example, focused flash units. These light sources move with the camera to help provide more consistent lighting of the scene.

After lighting correction is applied, the differences between the current images and the reference images are determined. In one embodiment, a pixel-by-pixel difference operation is performed, followed by a blur filter operation, and then an image segmentation operation. The N×N blur filter (such as a 5×5 kernel) smoothes out most of the high-frequency noise associated with the images, and can be adjusted to discard areas of various sizes. The blurred image is then segmented into distinct, non-touching areas. The centroid of each of the separate regions is computed and is stored in a list associated with each of the image pairs. An estimate of the size of the areas of interest can also be computed using the segmented pixel data and 3D measurement data.

The mathematical model for associating pixel locations with a specific direction vector to the target region assumes an ideal "pinhole" camera model. Actual cameras vary from this ideal model, so at the end of the image processing phase the lists of x, y pixel locations for the area centroids are corrected to compensate for optical and digital capture distortion. In one embodiment, this distortion is measured experimentally.

The resulting corrected pixel values (x', y'), which are defined relative to the center of the image, are then used with the three-dimensional data (pan, tilt, and distance values) for each of the image locations (measured earlier), to compute a vector from the instrument to the region of interest on the target. This vector is then converted into pan and tilt angles relative to the center of the image, which are used to drive the motors of the LPS unit to the desired orientation to align the LPS with the detected difference location. When the LPS unit reaches the desired pan and tilt angles another distance measurement is taken and used to compute the Cartesian (X, Y, Z) position of the region of interest on the target object, defined in the target object's coordinate system. If confirmation of the accuracy of the targeting process is required, an additional picture can be taken at this location. The region of interest will be in the center of the image.

The final step is to send the resulting position data to a file or to another application through an active communication channel, such as a network socket connection.

Variations of the above described processes may be implemented with the same infrastructure. In one example, system 400 is directed to take multiple measurements around the edges of the difference region in the image to get surface points on the target object, producing a three dimensional contour representation, which could be saved and used to retrace the contour at a later time. The result is a more accurate approximation of the size and shape of a region than the two dimensional image.

The preceding paragraph are directed to determination of non-moving changes on the target object (such as dents on a surface), however, the method may also be applied to movable objects on the target surface. To accomplish such a determination, a series of images are taken and used to track the three-dimensional path of the object moving along the surface of the calibrate target object.

The process for the moving difference region case is similar to the non-moving use case, with the addition of a step to re-center the camera on the detected region and take a new reference image at this location. Acquiring new reference images occurs for every new position measurement. The primary constraints for this use case is that the moving object moves relative to an already calibrated target object, and that the moving object does not move so fast that it leaves the area defined by the reference image. In order to handle faster moving object cases, a wider angle reference image could also be captured.

Compared to existing manual inspection and measurement processes, the described embodiments result in reduced errors, decreased inspection time, increased measurement accuracy, and improved safety for inspectors. As compared to systems with similar types of hardware, such as laser trackers, theodolites, and Total Stations, these lack the integration with an image processing application and the ability to communicate directly with other applications.

In certain embodiments, system 400 is fully automated, resulting in less human error and more accurate measurements. The measurement process used by LPS 410 is non-contact which results in improved safety, since maintenance workers do not need to physically reach all areas of an airplane for inspection, and less potential damage from measurement devices contacting the airplane. System 400, in some embodiments, may be integrated with other control or reporting systems to send information and receive commands, allowing development of closed-loop control systems that can adapt to changing conditions.

As described herein, system elements include the image capture and processing capabilities, and automated control processes that use two dimensional image data to generate three-dimensional measurements in the coordinates of the target object. To provide such embodiments, integration with LPS hardware and software, modifications to the LPS software for communication with external applications, and integration with one or more optional "client" applications that will be using the measured data are provided. As described, by properly capturing series of image pairs, changes in the target object can be detected, and converting into a form that can be used by LPS to determine 3D target coordinates.

The described embodiments enable automated measurement in the local coordinate system of the target object. System actions are based on visible changes detected on the surface of the target object though the analysis of before and after image pairs captured by the system 400. Once regions of interest are found in the image(s), the LPS 410 is directed to target the corresponding spot detected in the two-dimensional image. The system 400 performs a distance measurement, and then computes the three-dimensional position defined in the coordinate system of the target object.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for detecting and determining a location of visible areas of change on a target object, said method comprising:
    determining a first position and orientation of a local positioning system with respect to the target object;
    determining an offset between the first position and orientation and a second position and orientation of a local positioning system previously utilized to collect a set of reference images of the target object, wherein determining the offset comprises computing an offset transform from the first position and orientation of the local positioning system to the second position and orientation of the local positioning system previously utilized to collect the set of reference images, the second position and orientation in a coordinate system of the target object;
    repositioning, in position and orientation, the local positioning system with respect to the target object by the determined offset, wherein repositioning, in position and orientation, the local positioning system comprises utilizing the offset transform to reposition the local positioning system to substantially the second position and orientation of the local positioning system previously utilized to collect the set of reference images;
    utilizing the repositioned local positioning system to acquire a set of images of the target object from the second position and orientation;
    comparing the set of images to corresponding images within the set of reference images to detect a difference between the acquired set of images and the corresponding images within the set of reference images; and
    determining a location of the detected difference in the coordinate system of the target object.

2. The method according to claim 1 wherein determining a location of the detected difference comprises:
    defining a target vector from the local positioning system to the detected difference;
    measuring a range to the detected difference along the defined target vector; and
    using the measured range and the defined target vector to define a location of the detected difference in the coordinate system of the target object.

3. The method according to claim 2 wherein defining a target vector from the local positioning system to the detected difference comprises using pixel locations corresponding to the detected difference to define an azimuth and elevation for the pointing of the local positioning system.

4. The method according to claim 1 wherein comparing the set of images to corresponding images further comprises determining a relative displacement of features common to both an acquired image of the set of images and a corresponding image within the set of reference images.

5. The method according to claim 1 further comprising:
    calibrating a distance measuring device to the target object to generate a device-to-target calibration matrix; and
    acquiring the set of reference images of the target object along with Cartesian position data associated with a center of each of the images within the set of reference images.

6. The method according to claim 1 wherein comparing the set of images to corresponding images within the set of reference images to detect a difference comprises identifying regions of interest using at least one of image subtraction, blur filters, and image segmentation techniques.

7. The method according to claim 1 wherein comparing the set of images to corresponding images comprises:
    verifying that a region of interest in an acquired image of the set of images and a region of interest in the corresponding image within the set of references images are different;
    determining a centroid of the region of interest in the acquired image;
    determining pixel coordinates of the centroid; and
    performing a distortion correction to the region of interest to compensate for optics associated with the image acquisition device.

8. The method according to claim 7 further comprising determining azimuth and elevation angles to define a target vector.

9. A system for detecting and determining a location of visible areas of change on a target object in coordinates associated with the target object, said system comprising:
    a local positioning system comprising an image acquisition device, a range measurement device, and a target vector alignment device; and
    a processing device communicatively coupled to said image acquisition device, said range measurement device, and said target vector alignment device, said processing device programmed to:
    determine a first position and orientation of said local positioning system relative to the target object;
    compute an offset transform between the first position and orientation of said local positioning system and a reference position, the reference position being a second position and orientation of a local positioning system utilized to acquire a set of reference images associated with the target object;
    utilize the offset transform to generate instructions related to a repositioning of the local positioning system to substantially the reference position;
    operate said image acquisition device to acquire a set of images of the target object;
    compare the set of images to corresponding images within the set of reference images to detect a difference between the acquired set of images and the corresponding images within the set of reference images; and
    determine a location of the detected difference in the coordinates associated with the target object.

10. The system according to claim 9 wherein to determine a location of the detected difference, said processing device is programmed to:
    operate said target vector alignment device to define a target vector from said local positioning system to the detected difference;
    cause said range measurement device to measure a range to the detected difference along the defined target vector; and using the measured range and the defined target vector to determine a location of the detected difference in the coordinates associated with the target object.

11. The system according to claim 9 further comprising a mobile platform having at least said local positioning system mounted thereon, said mobile platform operable to utilize the instructions related to a repositioning and reorienting of the local positioning system for positioning of said mobile platform.

12. The system according to claim 9 wherein said processing device is programmed to utilize pixel locations corresponding to the detected difference to define an azimuth and elevation for the pointing of said local positioning system.

13. The system according to claim 9 wherein said processing device is programmed to determine a relative displacement of features common to both an acquired image of the set of images and a corresponding image within the set of reference images.

14. The system according to claim 9 wherein said processing device is programmed to detect differences in regions of interest within the set of images using at least one of image subtraction, blur filters, and image segmentation techniques.

15. The system according to claim 9 wherein to compare the set of images to corresponding images said processing device is programmed to:
 determine a centroid for a segmented region within the acquired image, where the acquired image and corresponding reference image do not match;
 determine pixel coordinates of the centroid; and
 perform a distortion correction to compensate for optics associated with said image acquisition device.

16. The system according to claim 9 wherein said processing device is further programmed to determine azimuth and elevation angles for alignment of said image acquisition device and said range measurement device along a target vector.

17. A method for providing a location for a visibly detectable change on a surface of a target object, the location provided in coordinates associated with the target object, said method comprising:
 determining a first position of an image acquisition device relative to the target object;
 computing an offset transform between the first position and a reference position of an image acquisition device utilized to acquire a reference image;
 utilizing the offset transform to reposition the image acquisition device to substantially the same location as the reference position; and
 acquiring an image of the target object with the image acquisition device;
 determining a two dimensional pixel location of a detectable change in the acquired image of at least a portion of the target object as compared to the reference image of at least a portion of the target object;
 utilizing the two dimensional pixel location to direct a local positioning system to the detectable change;
 taking measurements at the detectable change with the local positioning system; and
 computing, from the local positioning system measurements, the three dimensional positions of the detectable change in coordinates associated with the target object.

18. The method according to claim 17 wherein computing, from the local positioning system measurements, the three dimensional positions of the detectable change in coordinates associated with the target object comprises:
 directing the local positioning system onto the detectable change;
 acquiring a new reference image;
 after a time period, acquiring an image with the local positioning system;
 determining a change in position of the detectable change between the new reference image and the later acquired image; and
 repeating the directing, both acquiring, and the determining steps to provide a series of images for tracking a three-dimensional path of an object moving along the target object.

* * * * *